(12) United States Patent
Bye

(10) Patent No.: US 7,339,523 B2
(45) Date of Patent: Mar. 4, 2008

(54) NAVIGATION SYSTEM USING RADIO FREQUENCY TAGS

(75) Inventor: Charles T. Bye, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 45 days.

(21) Appl. No.: 11/294,582

(22) Filed: Dec. 5, 2005

(65) Prior Publication Data

US 2007/0126634 A1    Jun. 7, 2007

(51) Int. Cl.
*B24B 55/04* (2006.01)
*G01S 3/02* (2006.01)

(52) U.S. Cl. .................. 342/451; 342/463; 342/464; 342/465

(58) Field of Classification Search ............... 342/451, 342/463–465
See application file for complete search history.

(56) References Cited

U.S. PATENT DOCUMENTS

| | | | |
|---|---|---|---|
| 6,424,264 | B1 | 7/2002 | Giraldin et al. |
| 6,661,335 | B1 | 12/2003 | Seal |
| 6,774,782 | B2 | 8/2004 | Runyon et al. |
| 6,920,330 | B2 | 7/2005 | Caronni et al. |
| 7,005,968 | B1 * | 2/2006 | Bridgelall ............... 340/10.42 |
| 2001/0040512 | A1 | 11/2001 | Hines et al. |
| 2002/0163443 | A1 | 11/2002 | Stewart et al. |
| 2003/0013459 | A1 | 1/2003 | Rankin et al. |
| 2003/0155413 | A1 | 8/2003 | Kovesdi et al. |
| 2003/0214387 | A1 | 11/2003 | Giaccerini |
| 2004/0068368 | A1 | 4/2004 | Adams, Jr. et al. |
| 2004/0140931 | A1 | 7/2004 | Vesuna |
| 2004/0174269 | A1 | 9/2004 | Miller et al. |
| 2004/0185822 | A1 | 9/2004 | Tealdi et al. |
| 2004/0217864 | A1 | 11/2004 | Nowak et al. |
| 2004/0252034 | A1 | 12/2004 | Slemmer et al. |
| 2005/0048987 | A1 | 3/2005 | Glass |
| 2005/0060088 | A1 | 3/2005 | Helal et al. |
| 2005/0067492 | A1 | 3/2005 | Amitay et al. |
| 2005/0068168 | A1 | 3/2005 | Aupperle et al. |

(Continued)

FOREIGN PATENT DOCUMENTS

EP    0650074    4/1995

(Continued)

OTHER PUBLICATIONS

Vladimir Kulykin et al., "RFID in Robot-Assisted Indoor Navigation for the Visually Impaired," Publisher: Utah State University, Department of Computer Science, Published in: Logan, Utah, Sep. 20, 2004.

(Continued)

Primary Examiner—Thomas H. Tarcza
Assistant Examiner—Nga X Nguyen
(74) Attorney, Agent, or Firm—Fogg & Powers LLC

(57) ABSTRACT

A method of determining a location is provided. The method comprises placing a plurality of radio frequency (RF) tags within an area, mapping the placement of the plurality of RF tags within the area, detecting one or more of the plurality of RF tags in the area, and determining a location based in part on the mapping and on probability distributions associated with each of the one or more detected RF tags.

27 Claims, 5 Drawing Sheets

U.S. PATENT DOCUMENTS

| | | | |
|---|---|---|---|
| 2005/0093745 A1* | 5/2005 | Krumm et al. ............. 342/465 |
| 2005/0107934 A1 | 5/2005 | Gudat et al. |
| 2005/0116020 A1 | 6/2005 | Smolucha et al. |

FOREIGN PATENT DOCUMENTS

| | | |
|---|---|---|
| EP | 1126399 | 8/2001 |
| JP | 2004251816 | 9/2004 |
| JP | 2005055186 | 3/2005 |
| WO | WO02/31787 | 4/2002 |
| WO | WO2005/010798 | 2/2005 |

OTHER PUBLICATIONS

Leonard E. Miller et al., "RFID-Assisted Localization & Communication for 1st Responders," www.antd.nist.gov/wctg/RFID/RFIDassist.htm, Aug. 23, 2005.

Ichiro Satoh, "A Location Model for Pervasive Computing Environments," Publisher: National Institute of Informatics, Published in: Tokyo, Japan, Apr. 19, 2006.

* cited by examiner

NAVIGATION SYSTEM USING RADIO FREQUENCY TAGS

TECHNICAL FIELD

The present invention generally relates to navigation systems and, in particular, to a radio frequency tag navigation system.

BACKGROUND

Determining a user's position inside of a building can be very challenging if the building is large and the user is new to the surroundings. Various approaches have been attempted to determine a user's position in a building. For example, inertial guidance systems have been used. Typical inertial guidance systems use a combination of accelerometers and gyroscopes to measure acceleration and rotation. These measurements are then integrated to obtain measurements of position. However, all inertial guidance systems suffer from integration drift which magnifies small errors in acceleration and rotation measurements that increases unbounded over time. Any error becomes larger as successive measurements are integrated.

Another approach has been to use dead-reckoning. Dead-reckoning methods measure a distance and direction traveled. Then by knowing an initial starting point, the current position can be calculated. However, typical dead-reckoning systems use some type of compass to determine direction. When inside a building, the metal in the building can cause errors in compass measurements of direction. Additionally, since dead-reckoning depends on measuring a path from an initial starting point, dead-reckoning also suffers from integration drift where errors in initial measurements are magnified in subsequent measurements. Other approaches have also been attempted, but suffer from similar and different limitations in accuracy.

Yet another approach has been to use radio frequency (RF) ranging. RF ranging measures either the range of a receiver to multiple transmitters or the range of a single transmitter to several receivers. After measuring the range, a triangulation computation is performed. RF ranging does not suffer from integration drift and grow over time, but RF ranging suffers from incorrect range measurements due to multi-path issues and difficulties in receiving the signal.

For the reasons stated above, and for other reasons stated below which will become apparent to those skilled in the art upon reading and understanding the present specification, there is a need in the art for an efficient and effective navigation system that can be used inside a building.

SUMMARY

The above-mentioned problems and other problems are resolved by the present invention and will be understood by reading and studying the following specification.

In one embodiment, a method of determining a location is provided. The method comprises placing a plurality of radio frequency (RF) tags within an area, mapping the placement of the plurality of RF tags within the area, detecting one or more of the plurality of RF tags in the area, and determining a location based in part on the mapping and on probability distributions associated with each of the one or more detected RF tags.

In another embodiment, a radio frequency (RF) tag navigation system is provided. The RF tag navigation system comprises a plurality of RF tags positioned within a selected area, an RF tag reader adapted to move with a user, the RF tag reader further being adapted to receive signals from one or more of the plurality of RF tags that are in range of the RF tag reader, such that the one or more RF tags from which signals are received varies according to changes in the user's location, and a processing unit for receiving RF tag data from the RF tag reader, the processing unit being adapted to determine the user's location based on probability distributions for receiving a signal associated with each of the one or more RF tags from which a signal is received.

In another embodiment, a computer readable medium having computer-executable instructions for performing a method of determining a user's location within an area being mapped using radio frequency (RF) tags is provided. The method comprises receiving signal data for one or more RF tags, processing a probability distribution for receiving a signal for each of the one or more RF tags, and determining a user's location based on a combination of the probability distributions for the one or more RF tags for which signal data is received.

In yet another embodiment, a radio frequency (RF) tag navigation system is provided. The navigation system comprises a means for receiving signals from one or more of a plurality of RF tags positioned within an area, wherein signals are received from varying RF tags as a user's location changes. The system further comprises a means for calculating a user's location based on probability distribution of receiving a signal for each of the one or more RF tags.

DRAWINGS

DETAILED DESCRIPTION

Figure 1:
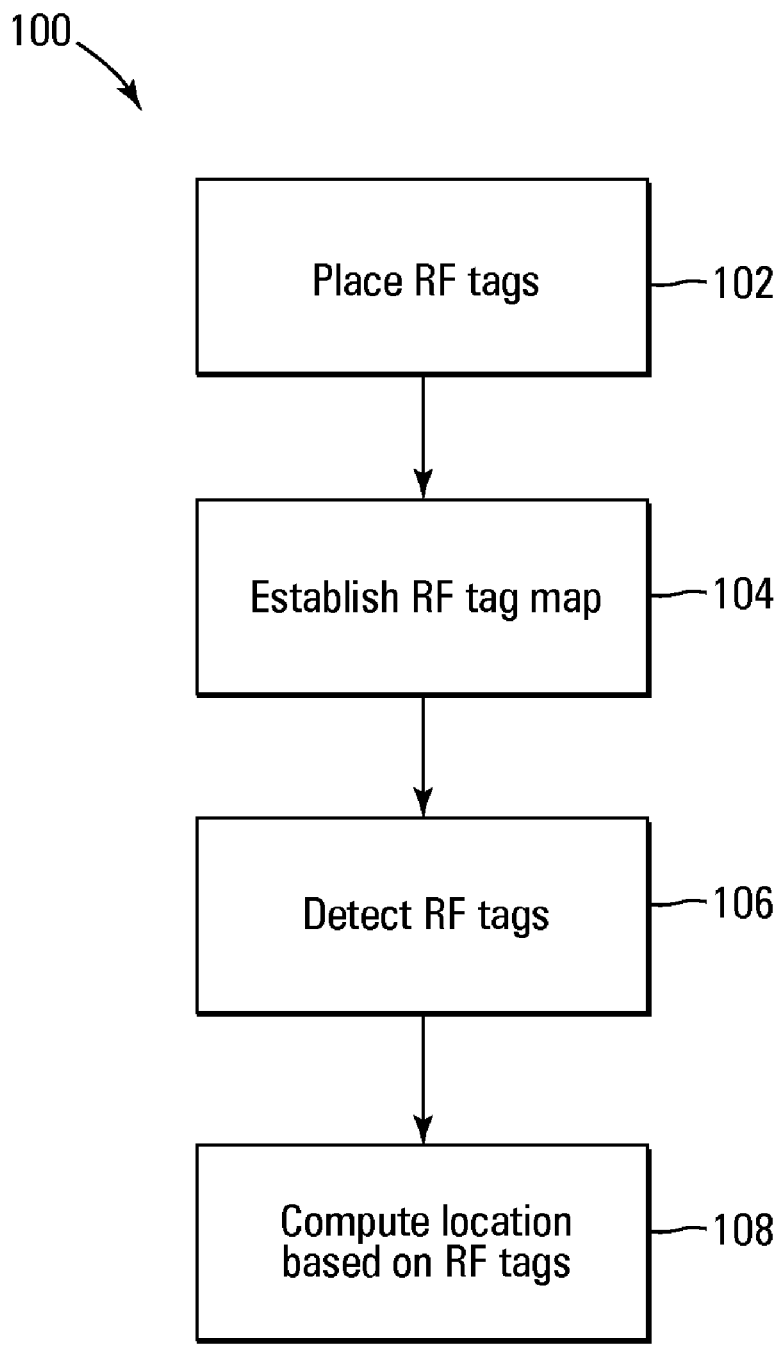
FIG. 1 is a navigation system flow chart illustrating one method of using radio frequency (RF) tags according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should also be understood that the exemplary methods illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Embodiments of the present invention provide relatively accurate positioning data. Embodiments of the present invention use radio frequency (RF) tags to map an area and locate a user. An RF tag is an RF device that transmits its identification (ID) code and a signal either on a continual basis or when queried by a transmitting device. RF tags are an emerging technology which will become increasingly less expensive in the future as use of RF tags becomes more widespread. Therefore, embodiments of the present invention will become less and less expensive. Also, because embodiments of the present invention determine a user's location based on RF signals received from various RF tags, rather than depending on initial or previous locations, embodiments of the present invention do not suffer from integration drift like other approaches. Additionally, due to the small size of typical RF tags, a large number of RF tags can be used in any given building. The larger the number of RF tags used, the more accurate the location determinations in embodiments of the present invention.

In addition, in some embodiments of the present invention, other sensors such as those used in inertial navigation and dead-reckoning systems are used to improve the RF position estimate by providing a path over which the user has passed. The accuracy of embodiments of the present invention due to the use RF tags and, the ability to combine this information with inertial navigation or dead-reckoning data is an advantage over other approaches commonly attempted. Also, although embodiments of the present invention provide an accurate solution to positioning in a building, embodiments of the present invention can also be used in outside areas, such as zoos, amusement parks and the like.

FIG. 1 is a navigation system flow chart 100 illustrating one method of using radio frequency (RF) tags according to one embodiment of the present invention. At 102, RF tags are placed within an area to be mapped. In some embodiments, the RF tags are placed in such a manner that at least a portion of the range of each RF tag overlaps with a portion of the range of other RF tags and the area being mapped falls within the combined ranges of the RF tags, as described in more detail below with regards to FIG. 2. In some embodiments, the RF tags are placed in a building as it is being erected. In other embodiments, the RF tags are placed in a building after it has been erected. In yet other embodiments, the RF tags are placed outdoors rather than inside a building, such as in an amusement park, zoos, and the like. Additionally, in some embodiments, the RF tags used are passive. In other embodiments, the RF tags are active. In yet other embodiments a combination of passive and active RF tags are used. Passive RF tags do not require an internal non-RF power source, whereas active RF tags have an internal power source, such as a battery, hard-wired power, or solar cells. Additionally, active RF tags typically have a longer range and can transmit more information than passive RF tags. However, passive RF tags are typically less expensive to produce than active RF tags and require little to no maintenance.

Once the RF tags are placed, an RF tag map is established at 104. The RF tag map includes a 3-Dimensional location and identification number for each RF tag. The 3-Dimensional location is one of a geodetic location and a relative location. Additionally, in some embodiments, the RF tag map includes a probability distribution for detecting each RF tag at various positions within the area being mapped, but not used in their embodiment. In some embodiments, the probability distribution is unique to each RF tag. In other embodiments, a nominal Gaussian distribution is used. At 106, a user, within the area being mapped, detects signals from one or more RF tags with an RF tag reader. Based on the RF tag signal information detected, a user's location is calculated at 108. The RF tag signal information used in some embodiments includes, but is not limited to, the RF signals and signal strength. Additionally, in some embodiments, one or more of a history of previous locations and path traveled, as well as, inertial navigation data, dead-reckoning data and physical limitations of the user, such as a user's maximum velocity, are used in combination with the RF tag signal information to calculate a user's position.

Figure 2:
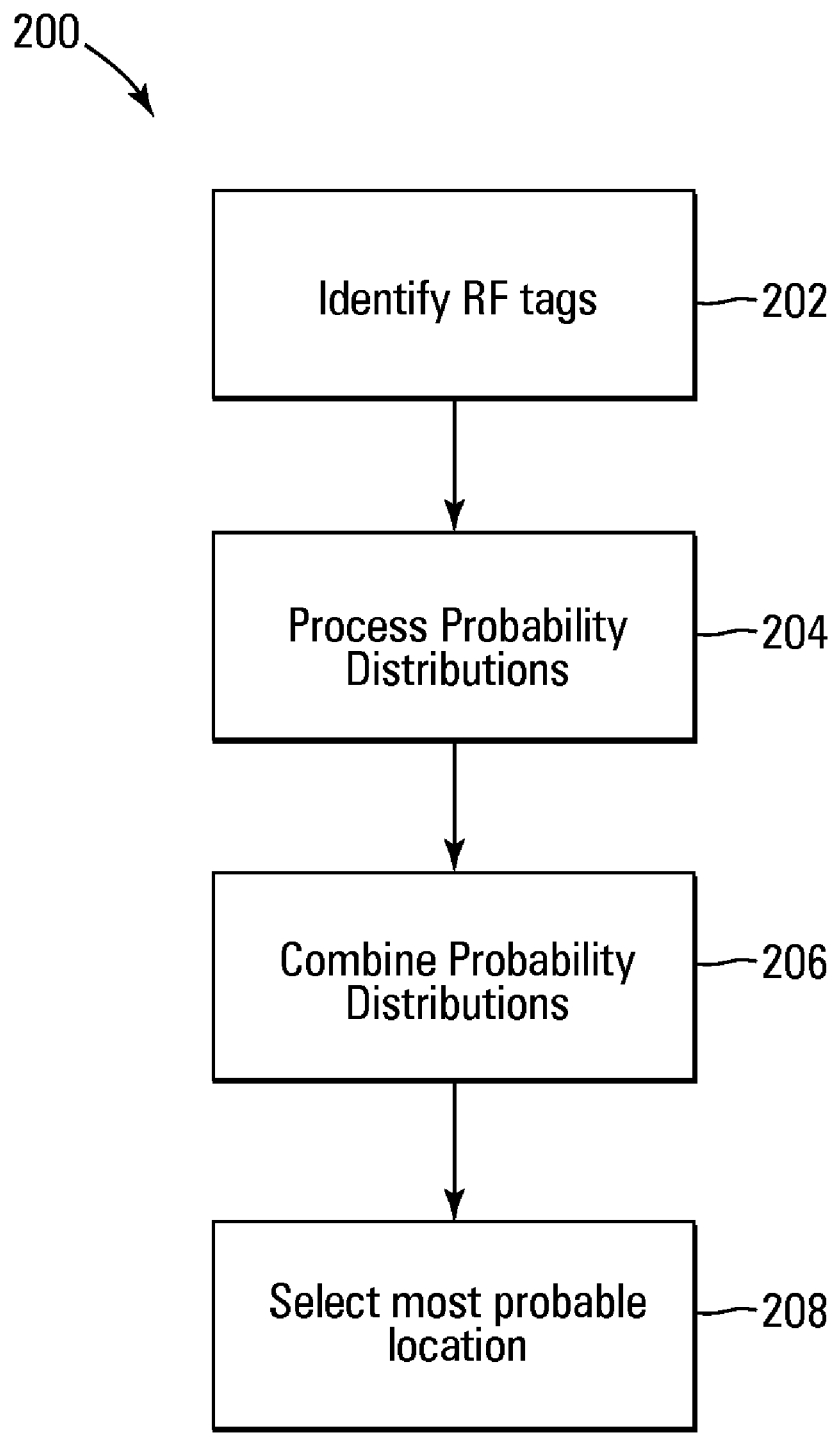
FIG. 2 is a flow chart illustrating one method of calculating a position based on detected RF signals according to one embodiment of the present invention.

FIG. 2 is a flow chart 200 illustrating one method of calculating a position based on detected RF signals according to one embodiment of the present invention. At 202, each RF tag transmitting a detected signal is identified by a unique identification number in the signal. At 206, a probability distribution associated with each detected and identified RF tag is processed. The probability in some embodiments is a unique probability distribution for each RF tag. In other embodiments, a nominal probability distribution is used. In some embodiments, the probability distribution for each identified RF tag is calculated previously and retrieved from a database based on the identification number of the detected RF tags. In other embodiments, a probability distribution is calculated for each detected RF tag when the RF tag is detected. In some such embodiments, the probability distribution is calculated based on the signal strength detected for each RF tag. The probability distribution based on the signal strength represents the probability of receiving a signal at a given signal strength from a given RF tag.

At 206, the unique probability distribution associated with each of the detected RF tags is combined with the unique probability distributions associated with the other detected RF tags to calculate a combined probability distribution of detecting all of the detected RF tags. In some embodiments, the probability distributions are weighted based on the signal strength of each detected RF tag. Therefore, when combining the probability distributions, the probability distribution of an RF tag with a strong signal is weighted more than the probability distribution of an RF tag with a weak signal. At 208, based on this combined probability distribution, the most probable position for detecting all of the detected RF tags is selected as the current location of the user. In some embodiments, the combined probability distribution is augmented with additional navigation data from other sensors, such as Global Positioning System sensors, Galileo sensor station, magnetic sensors, barometric pressure/altimeter sensors, gyroscopes, and accelerometers. For example, in some embodiments, a dead-reckoning navigation system is used. In such embodiments, a typical dead-reckoning navigation system consists of at least a magnetometer and an accelerometer and measures direction and distance traveled from a known reference point. In other embodiments, an inertial navigation system which typically consists of three accelerometers and three gyroscopes, among other possible components such as those listed above.

The calculated positions based on other sensor data and the positions based on RF tag signals are then combined using techniques known to one of skill in the art, such as Kalman filter blending or autocorrelation. In some embodiments, the data from other sensors is used to weight the combined probability distribution. In other embodiments, the data from other sensors is combined with a location selected from the combined probability distribution to determine a user's location. Additionally, the physical capabilities of the user, such as how fast a user can move, are also included in combining the probability distributions with other sensor data. The user's location is then determined by selecting the most probable location in the distribution. For example, in some embodiments, the other sensor data provides a path over which the user has passed. The path as measured by the other sensors is combined with the RF probability distributions for multiple points (e.g. probability distributions are obtained at a regular interval of time as the user travels) by matching the path to the RF distributions. The path that produces the highest cumulative probability is the most likely path and the end of the path is the user's location. Additionally, in some embodiments, the position selected is further based on additional information such as, past probability distributions and a history of determined position locations.

Figure 3:
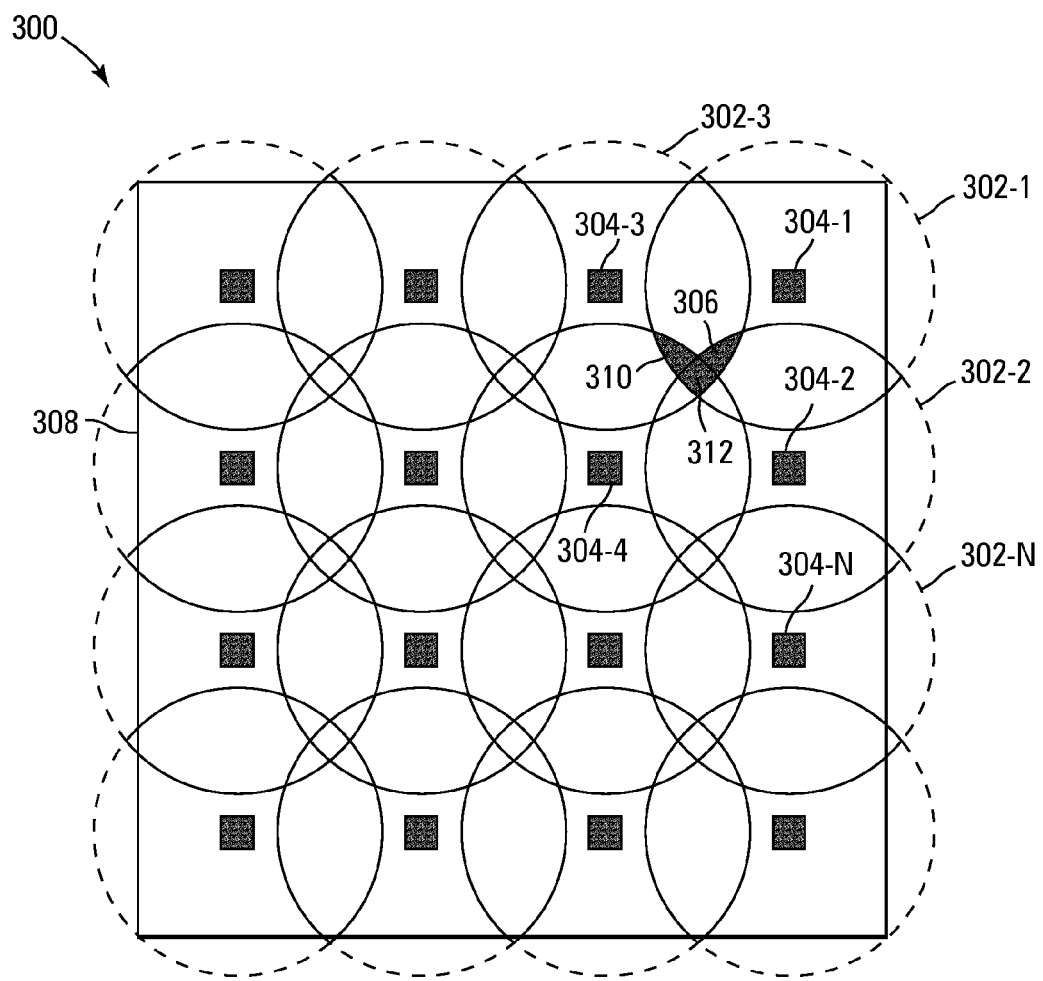
FIG. 3 is diagram showing a map of placement of RF tags according to one embodiment of the present invention.

FIG. 3 is diagram showing a map 300 of placement of RF tags 304-1 . . . 304-N according to one embodiment of the present invention. In FIG. 3, an area 308 is mapped using RF tags 304-1 . . . 304-N. N number of RF tags are used to map area 308. As the number of RF tags used increases, the accuracy of calculating location also increases. For purposes of demonstration only, the range of each of RF tags 304-1 . . . 304-N is represented by circles 302-1 . . . 302-N, respectively. Dotted portions of circles 302-1 . . . 302-N represent ranges of RF tags 304-1 . . . 304-N which lay outside of area 308. Although, ranges of RF tags 304-1 . . . 304-N are represented by circles 302-1 . . . 302-N, it will be understood by one of skill in the art, that actual ranges are not defined by distinct cut off points formed by the circumference of circles 302-1 . . . 302-N. Instead, it will be understood by one of skill in the art that actual ranges are probability distributions of the likelihood of receiving a signal. The probability distributions have a peak at the location of the tag and then reduce to zero as the range increases. In some embodiments, a nominal probability distribution is used. The shape of the nominal distribution is a 3-D Gaussian distribution. In other embodiments, a unique probability distribution is used for each RF tag. In some embodiments, the shape of the probability distribution for the RF tags varies based on the individual RF tag, structural surroundings, etc. Additionally, sections of overlapping signals from RF tags 304-1 . . . 304-N vary and are not to be limited to the representative overlapping sections formed by circles 302-1 . . . 302-N.

As a user moves within area 308, an RF tag reader with the user will detect signals from one or more RF tags 304-1 . . . 304-N. A probability distribution is associated with each of RF tags, 304-1 . . . 304-N. The probability distribution associated with a given RF tag 304-N represents the probability of detecting a signal from that RF tag 304-N at different locations in area 308 based on the range of that RF tag 304-N. The location of the user is then determined based on the combination of the probability distribution associated with each detected RF tag, as described below with regards to FIG. 3. For example, if an RF tag reader detects signals only from RF tags 304-1, 304-2, and 304-3, it is more probable that the user is located within overlapping section 306 than overlapping section 310 because there is a lower probability of receiving a signal from RF tag 304-2 in section 310 than in section 306. As such, the most probable location within overlapping section 306 is determined as the location of the user.

In some embodiments, the location of RF tags from which a signal is not received is included in the determination of a user's locations. For example, if a signal is received only from RF tags 304-1, 304-2, and 304-3, it may be just as probable for a user to be located in section 306 as section 312. However, since a signal is not received from RF tag 304-4, section 312 becomes less probable than section 306. Also, in some embodiments, the probability distributions are weighted based on the signal strength of each detected RF tag 304-1 . . . 304-N. Therefore, when combining the probability distributions, the probability distribution of an RF tag with a strong signal is weighted more than the probability distribution of an RF tag with a weak signal. This weighting further improves the accuracy in determining location.

Additionally, in some embodiments, data from other navigation sensors, such as inertial navigation sensors, is integrated with the probability distribution to improve accuracy of the determined user location. In other embodiments, a history of probability distributions and recorded position estimates are used to improve accuracy of the determined user location.

Figure 4:
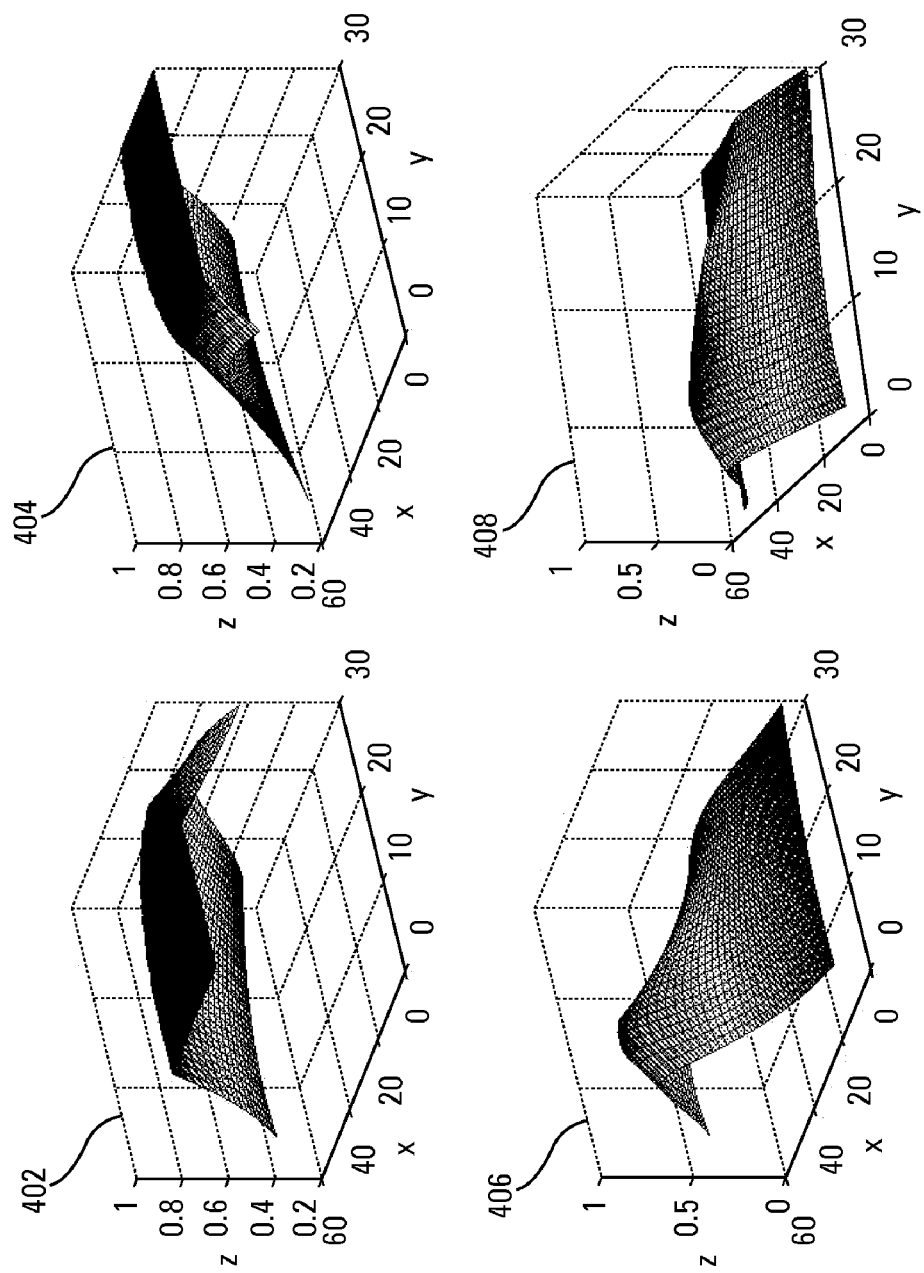
FIG. 4 is a diagram showing four charts of exemplary probability distributions associated with RF tags according to one embodiment of the present invention.

FIG. 4 is a diagram showing four charts of exemplary probability distributions associated with RF tags according to one embodiment of the present invention. In each of charts 402-408, maximum probability is represented by the value 1 and minimum probability is represented by the value 0 on the z axis. Values along the x and y axes represent 2-Dimensional coordinates for positions within a mapped area, such as area 308 in FIG. 3. For purposes of explanation only, 2-dimensional position coordinates are used in charts 402-408. However, it will be understood by one of skill in the art that, in other embodiments, 3-dimensional position coordinates are used providing position calculations for both horizontal and vertical positions. Charts 402, 404 and 406 represent exemplary probability distributions associated with three separate RF tags. As can be seen, certain x,y coordinates are associated with a higher probability of receiving a signal than other x,y coordinates. Additionally, as can be seen, the probability of receiving a signal from a particular RF tag at a given x,y coordinate depends on the particular RF tag.

Chart 408 depicts a combined probability distribution from combining the probability distributions from charts 402, 404, and 406. If an RF tag reader detects a signal from the three RF tags associated with the probability distributions in charts 402, 404, and 406, then the location of the RF tag reader is determined based on the set of coordinates associated with the highest probability in chart 408. In some embodiments, the probability distributions in charts 402, 404 and 406 are weighted based on the signal strength of the respective signals. Therefore, in combining the probability distributions, the probability distribution of an RF tag with a stronger signal will be weighted more than the probability distribution of an RF tag with a weaker signal. Additionally, in some embodiments, sensor data from other sensors is used to augment the combined probability distribution in chart 408. For example, in some embodiments, inertial sensors are used to calculate an approximate position. This calculated position is then combined with the calculated probability distribution in chart 408 using techniques known to one of skill in the art. The additional data from the inertial sensors alters the probability distribution such that a higher probability exists for x,y coordinates corresponding to the inertial calculated position. For purposes of explanation only, this example describes a 2-dimensional position. However, it will be understood by one of skill in the art that, in other embodiment, 3-dimensional positions are calculated. In other embodiments, other sensor data is used to augment the calculated probability distribution.

Figure 5:
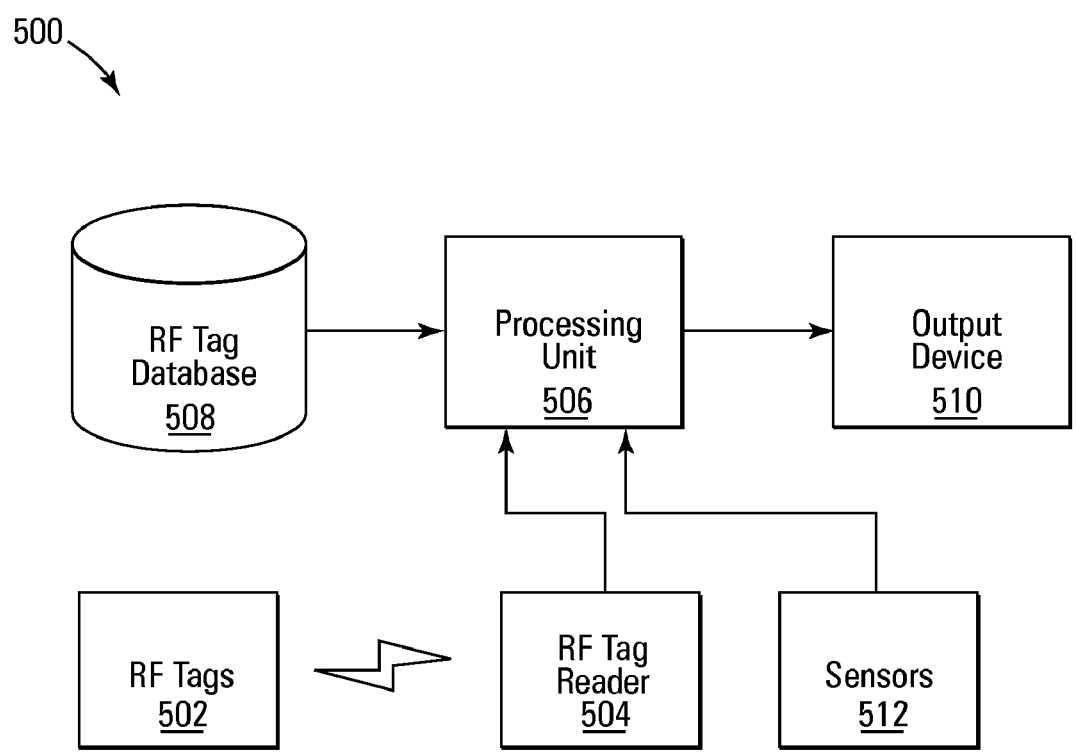
FIG. 5 is a block diagram of an RF tag navigation system according to one embodiment of the present invention.

FIG. 5 is a block diagram of an RF tag navigation system 500 according to one embodiment of the present invention. In FIG. 5, an exemplary RF tag navigation system 500 includes processing unit 506 configured to provide processed data to output device 510. In some embodiments, output device 510 is instantiated as at least one of a graphical display element for rendering two and three dimensional representation of location, a digital readout for displaying digital values of location, and an audio device for providing auditory statements of location. Additionally, in some embodiments, output device 510 includes a storage device for storing the navigation data.

Processing unit 506 includes or interfaces with hardware components that support the graphics display system. By way of example and not by way of limitation, these hardware components include one or more microprocessors, graphics processors, memories, storage devices, interface cards, and other standard components known in the art. Additionally, processor 602 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium. These instructions include instructions for determining a user's location based on probability distributions associated with a plurality of RF tags. Additionally, the instructions include instructions for calculating and combining probability distributions associated with a plurality of RF tags.

In FIG. 5, processing unit 506 is coupled to RF tag database 508 and RF tag reader 504. RF tag reader 504 detects one or more of RF tags 502 by receiving radio frequency transmissions from one or more RF tags 502. In some embodiments, RF tags 502 are passive. In other embodiments, RF tags 502 are active. The radio frequency transmissions from RF tags 502 include at least a unique identification number for each of RF tags 502. In some embodiments, the unique identification number is an encoded digital stream. In other embodiments, the unique identification number is transmitted by varying the pulse repetition rate. As a user moves about an area being mapped with RF tags 502, the one or more RF tags 502 from which RF tag reader receives radio frequency transmissions changes, as described above. RF tag reader 504 decodes the radio frequency transmissions and sends at least a unique identification number to processing unit 506 for each of RF tags 502 detected.

Based on the unique identification numbers received from RF tag reader 504, processing unit 506 retrieves RF tag location data and associated probability distributions from RF tag database 508 for each of RF tags 502 detected. RF tag database 508 includes any appropriate medium used for storage such as floppy disks, conventional hard disks, CD-ROM, flash ROM, nonvolatile ROM, RAM, and other like medium. Processing unit 506 combines the probability distributions retrieved to calculate a combined probability distribution. Processing unit 506 determines the location of the user based on the most probable location in the combined probability distribution. Data for the determined user location is sent to output device 510 by processing unit 506.

In FIG. 5, processing unit 506 is also coupled to sensors 512. In some embodiments, sensors 512 are not included. Sensors 512 include one or more navigational sensors, such as, inertial navigation sensors, dead-reckoning navigation sensors, etc. Processing unit 506 calculates a user location based on data from sensors 512. In some embodiments, processing unit 506 blends data from sensors 512 with the combined probability distribution calculated based on data from RF tag database 508 and RF tag reader 504. In some embodiments, blending the data from sensors 512 includes weighting more heavily locations in the combined probability distribution which correspond to a user location calculated based on data from sensors 512. In other embodiments, blending the data from sensors 512 includes combining the determined user location from the combined probability distribution with the calculated user location from sensors 512 data using known techniques such as a Kalman filtering algorithm.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of determining a location, the method comprising:
   placing a plurality of radio frequency (RF) tags within an area;
   mapping the placement of the plurality of RF tags within the area;
   detecting one or more of the plurality of RF tags in the area; and
   determining a location based in part on the mapping and on probability distributions associated with each of the one or more detected RF tags, wherein each probability distribution represents the probability of detecting its associated RF tag from each of a plurality of locations.

2. The method of claim 1, wherein determining a location further comprises:
   determining a location based on the location of RF tags not detected.

3. The method of claim 1, further comprising:
   calculating a probability distribution for each RF tag within the area; and
   storing the calculated probability distributions in a database with location data for each associated RF tag.

4. The method of claim 1, wherein detecting one or more RF tags further comprises: calculating a probability distribution for each RF tag when each RF tag is detected.

5. The method of claim 4, wherein calculating a probability distribution for each RF tag further comprises calculating a probability distribution for each RF tag based on the signal strength of a signal from each detected RF tag.

6. The method of claim 4, wherein calculating a probability distribution further comprises calculating a unique probability distribution for each RF tag.

7. The method of claim 1, wherein determining a location based on probability distributions further comprises:
   combining each probability distribution associated with the one or more detected RF tags to obtain a combined probability distribution, wherein the location is determined based on coordinates in the combined probability distribution corresponding to the highest probability.

8. The method of claim 7, wherein combining each probability distribution includes weighting each probability distribution based on the signal strength of the corresponding detected RF tag.

9. The method of claim 1, further comprising:
receiving navigational data from one or more additional sensors, wherein the navigational data is combined with the probability distributions associated with the one or more detected RF tags to determine a location.

10. The method of claim 9, wherein receiving navigational data from one or more additional sensors includes one of:
combining the navigational data substantially instantaneously with the probability distributions associated with the one or more detected RF tags; and
combining the navigational data with the probability distributions associated with the one or more RF tags using a history of probability distributions and recorded position estimates.

11. A radio frequency (RF) tag navigation system comprising:
a plurality of RF tags positioned within a selected area;
an RF tag reader adapted to move with a user, the RF tag reader further being adapted to receive signals from one or more of the plurality of RF tags that are in range of the RF tag reader, such that the one or more RF tags from which signals are received varies according to changes in the user's location; and
a processing unit for receiving RF tag data from the RF tag reader, the processing unit being adapted to determine the user's location based on probability distributions for receiving a signal associated with each of the one or more RF tags from which a signal is received, wherein each probability distribution represents the probability of detecting its associated RF tag from each of a plurality of locations.

12. The RF tag navigation system of claim 11, further comprising:
an RF tag database, the RF tag database being adapted to store location data and probability distribution data for each of the plurality of RF tags.

13. The RF tag navigation system of claim 11, wherein the plurality of RF tags includes
at least one of a passive RF tag and an active RF tag.

14. The RF tag navigation system of claim 11, farther comprising navigational sensors for providing navigation data to the processing unit, the processing unit being adapted to determine the user's location based on the probability distributions and data from the navigational sensors.

15. The RF tag navigation system of claim 11, wherein the processing unit calculates a probability distribution for each RF tag when a signal is received, the probability distribution being based on the signal strength of the RF tag signal received.

16. The RF tag navigation system of claim 15, wherein the processing unit calculates a unique probability distribution for each RF tag when a signal is received.

17. The RF tag navigation system of claim 11, wherein the processing unit combines the probability distribution for each of the one or more of the plurality of RF tags, from which a signal is received, into one probability distribution for receiving a signal from all of the one or more of the plurality of RF tags, the user's location being determined to be a set of coordinates corresponding to the highest probability in the combined probability distribution.

18. The RF tag navigation system of claim 17, wherein, when combining the probability distributions, the processing unit is adapted to weight each of the probability distributions based on the signal strength of the signal received from each of the one or more RF tags.

19. A computer readable medium having computer-executable instructions for performing a method of determining a user's location within an area being mapped using radio frequency (RF) tags, the method comprising:
receiving signal data for one or more RF tags;
processing a probability distribution for receiving a signal for each of the one or more RF tags; and
determining a user's location based on a combination of the probability distributions for the one or more RF tags for which signal data is received.

20. The computer readable medium of claim 19, further comprising:
receiving data from navigation sensors the navigation data being used in conjunction with the combination of probability distributions in determining a user's location.

21. The computer readable medium of claim 19, wherein determining a user's location based on a combination of the probability distributions includes determining a user's location based on a weighted combination of the probability distributions, wherein the probability distributions are weighted according to the strength of the signal received for each of the one or more RF tags.

22. The computer readable medium of claim 19, wherein processing a probability distribution further comprises receiving a probability distribution from an RF tag database based on the signal data received.

23. The computer readable medium of claim 19, wherein processing a probability distribution further comprises calculating a probability distribution for each of the one or more RF tags in real-time as the signal data is received.

24. The computer readable medium of claim 23, wherein calculating a probability distribution further comprises calculating a probability distribution for each of the one or more RF tags based on the strength of the signal received for each of the one or more RF tags.

25. The computer readable medium of claim 23, wherein calculating a probability distribution further comprises calculating a unique probability distribution for each of the one or more RF tags.

26. A radio frequency (RF) tag navigation system comprising:
a means for receiving signals from one or more of a plurality of RF tags positioned within an area, wherein signals are received from varying RF tags as a user's location changes; and
a means for calculating a user's location based on probability distribution of receiving a signal for each of the one or more RF tags, wherein each probability distribution represents the probability of detecting its associated RF tag from each of a plurality of locations.

27. The radio frequency (RF) tag navigation system of claim 26 further comprising:
a means for obtaining additional navigational data; and
a means for combining the navigational data with the probability distribution of receiving a signal for each of the one or more RF tags.

* * * * *

UNITED STATES PATENT AND TRADEMARK OFFICE
CERTIFICATE OF CORRECTION

PATENT NO. : 7,339,523 B2 Page 1 of 1
APPLICATION NO. : 11/294582
DATED : March 4, 2008
INVENTOR(S) : Charles T. Bye It is certified that error appears in the above-identified patent and that said Letters Patent is hereby corrected as shown below:

Column 9, line 45:
In Claim 14 "farther" should be --further--

Signed and Sealed this

Twenty-sixth Day of August, 2008

JON W. DUDAS
*Director of the United States Patent and Trademark Office*